(12) United States Patent  (10) Patent No.: US 7,111,036 B1
Nakanishi  (45) Date of Patent: Sep. 19, 2006

(54) NETWORK DATA TERMINAL AND DATA PRINTING METHOD THEREFOR

(75) Inventor: Kanji Nakanishi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1132 days.

(21) Appl. No.: 09/688,134

(22) Filed: Oct. 16, 2000

(30) Foreign Application Priority Data

Oct. 15, 1999  (JP)  ................................ 11-294128

(51) Int. Cl.
| | |
|---|---|
| G06F 15/16 | (2006.01) |
| G06F 15/173 | (2006.01) |
| G06F 3/12 | (2006.01) |
| G07G 1/14 | (2006.01) |
| G06K 1/00 | (2006.01) |
| G06Q 30/00 | (2006.01) |
| G06F 15/00 | (2006.01) |
| G06K 15/00 | (2006.01) |

(52) U.S. Cl. ........................ 709/203; 709/225; 705/14; 358/1.15; 358/1.18

(58) Field of Classification Search ................ 709/203, 709/225; 705/14; 358/1.15, 1.18
See application file for complete search history.

(56) References Cited

U.S. PATENT DOCUMENTS

| | | | |
|---|---|---|---|
| 5,532,735 A | 7/1996 | Blahut et al. ................... 348/13 |
| 5,664,073 A * | 9/1997 | Faes et al. ................... 358/1.13 |
| 5,911,044 A * | 6/1999 | Lo et al. ...................... 709/203 |
| 5,987,230 A * | 11/1999 | Shimizu ..................... 358/1.16 |
| 6,115,739 A * | 9/2000 | Ogawa et al. ............... 709/215 |
| 6,167,382 A * | 12/2000 | Sparks et al. ................. 705/26 |
| 6,321,266 B1 * | 11/2001 | Yokomizo et al. ........... 709/226 |
| 6,487,538 B1 * | 11/2002 | Gupta et al. .................. 705/14 |
| 6,502,076 B1 * | 12/2002 | Smith ........................... 705/14 |
| 6,542,936 B1 * | 4/2003 | Mayle et al. ................. 709/250 |
| 6,864,990 B1 * | 3/2005 | Nickerson et al. .......... 358/1.15 |
| 6,985,452 B1 * | 1/2006 | Marshall et al. ............. 370/310 |
| 7,031,005 B1 * | 4/2006 | Nakanishi ................... 358/1.15 |
| 2001/0018664 A1 * | 8/2001 | Jacoves et al. ................ 705/14 |

FOREIGN PATENT DOCUMENTS

| | | |
|---|---|---|
| JP | 7-303087 | 11/1995 |
| JP | 8-256256 | 10/1996 |
| JP | 9-90832 | 4/1997 |

OTHER PUBLICATIONS

Patent Abstract of Japan, 9-90832, Apr. 4, 1997.
Patent Abstract of Japan, 8-256256, Oct. 1, 1996.
Patent Abstract of Japan, 7-303087, Nov. 14, 1995.

* cited by examiner

Primary Examiner—Jason Cardone
Assistant Examiner—Melvin H. Pollack
(74) Attorney, Agent, or Firm—Sughrue Mion, PLLC

(57) ABSTRACT

A data terminal of a network is used for printing information retrieved from the network, by use of a printer connectable to or incorporated into the data terminal. Along with the information, ad data selected from among those periodically downloaded and stored in the data terminal is printed on the same recording sheet. The user chooses which side of the recording sheet the ad data is to be printed, on the same side as the information or on the opposite side from the information. The data terminal automatically selects those ad data which relates to the category of the information, or the user may designate categories of the ad data to print with the information. A charge modification data producer of the data terminal produces charge modification data and sends it to a provider of the information, for modifying charge for the provision of the information depending upon the amount of ad data printed with the information.

18 Claims, 6 Drawing Sheets

NETWORK DATA TERMINAL AND DATA PRINTING METHOD THEREFOR

BACKGROUND OF THE INVENTION

1. Field of the Invention

The present invention relates a data terminal of a network, which is used for selecting information from the network to print it as a hard copy. The present invention also relates to a data printing method for the data terminal.

2. Background Arts

Many kinds of network data terminals, such as a set top box, are getting popular. The set top box is connected to a home TV, so data of any kinds provided through a network may be observed on TV.

To have information provided through the network, the user pays a connection charge or the like to a data provider. A program sending method in an interactive service is suggested in JPA 7-303087, wherein ad data is provided through the network to charge the advertisers for the advertisement, and thereby reduce charges on the users, including the connection charges, according to the amount of ad data. In this way, the charges on the users are cut down as low as possible. In this program sending method, the user can select the service from among those accompanied with different amounts of advertisements. The charge for the service varies depending upon the amount of advertisements. For example, the lower charge is applied to the service with the larger amount of advertisement.

When information retrieved from the network is wanted to be reserved as a hard copy, a printer is connected to the network data terminal or a printer incorporated into the network data terminal is used. In that case, printing ad data along with the selected information, and adjusting the charge in accordance with the printed amount of ad data is advantageous for the sake of reducing the charge on the user. Also the network service provider could get paid for the advertisement.

It is to be noted that JPA 8-256256 and JPA 9-90832 suggest merging an ad image in a selected image when making a copy of the selected image.

Since the ad image is merged with the selected image into a composite image, the quality of the selected image can be damaged by the merge of the ad image. Furthermore, paper consumption increases with the amount of ad image. When the user wants to get a copy of the selected image separately from a copy of the ad image, the user is required to make a complicated operation.

SUMMARY OF THE INVENTION

In view of the foregoing, an object of the present invention is to provide a network data terminal and a data printing method therefor, wherein information selected by a user from a network may be printed with an adequate quality even when ad data from the network is printed along with the information, for example, for the purpose of reducing the charge on the user.

Another object of the present invention is to provide a network data terminal and a data printing method therefor, wherein information selected by a user from a network may be printed along with ad data of those kinds which may interest the user.

According to an aspect of the present invention, a network data terminal for printing information obtained from a network comprises:

a printer that is connectable to or incorporated into the data terminal, and is capable of printing on opposite sides of a recording sheet;

a memory device for storing ad data received from the network;

a device for allowing a user of the data terminal to choose whether to print the ad data on the same side of a recording sheet as the information or on the opposite side from the information;

a print control device that produces print image data for one side or for both sides from the information and the ad data in accordance with which side of the recording sheet the ad data is to print, and controls the printer in accordance with the print image data; and a charge modification data sending device for sending data for modifying charge for provision of the information in accordance with amount of ad data printed with the information.

By choosing the reverse side for printing ad data, information and ad data are printed on the opposite sides of a recording sheet. Then, an entire print area on the obverse side the recording sheet may be used for printing the information, so the information may be printed at a sufficient magnification necessary for an adequate image quality. On the other hand, a larger amount of ad data may be printed on the reverse side. Therefore, the advertising effect is improved. This is advantageous especially where the charge for provision of the information on the user is reduced as the larger amount of ad data is printed with the information.

It is preferable to provide a device for allowing the user to designate categories of ad data to print with the information.

According to another aspect of the present invention, a network data terminal for printing information obtained from a network comprising:

a printer that is connectable to or incorporated into the data terminal, and is capable of printing on opposite sides of a recording sheet;

a memory device for storing ad data received from the network;

a sorting device for detecting a category of the information to print, and automatically sorting out those ad data relating to the category of the information;

a print control device that produces print image data from the information and the ad data sorted by the sorting device, and controls the printer in accordance with the print image data; and a charge modification data sending device for sending data for modifying charge for provision of the information in accordance with amount of ad data printed with the information.

Since the ad data printed with the information relates to the category of the information, the ad data is more likely to interest the user.

A printing method of the present invention for printing information obtained from a network by use of a printer that is connectable to or incorporated into a data terminal of the network, comprises the steps of:

storing ad data received from the network;

detecting a category of the information to print;

sorting out those ad data relating to the category of the information;

printing the sorted ad data along with the information; and modifying charge for provision of the information in accordance with the amount of ad data printed with the information.

Another printing method of the present invention for printing information obtained from a network by use of a printer that is connectable to or incorporated into a data terminal of the network, comprises the steps of:

storing ad data received from the network;

printing the information on an obverse side of a recording sheet, while printing the ad data on a reverse side of the recording sheet; and modifying charge for provision of the information in accordance with amount of ad data printed with the information.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
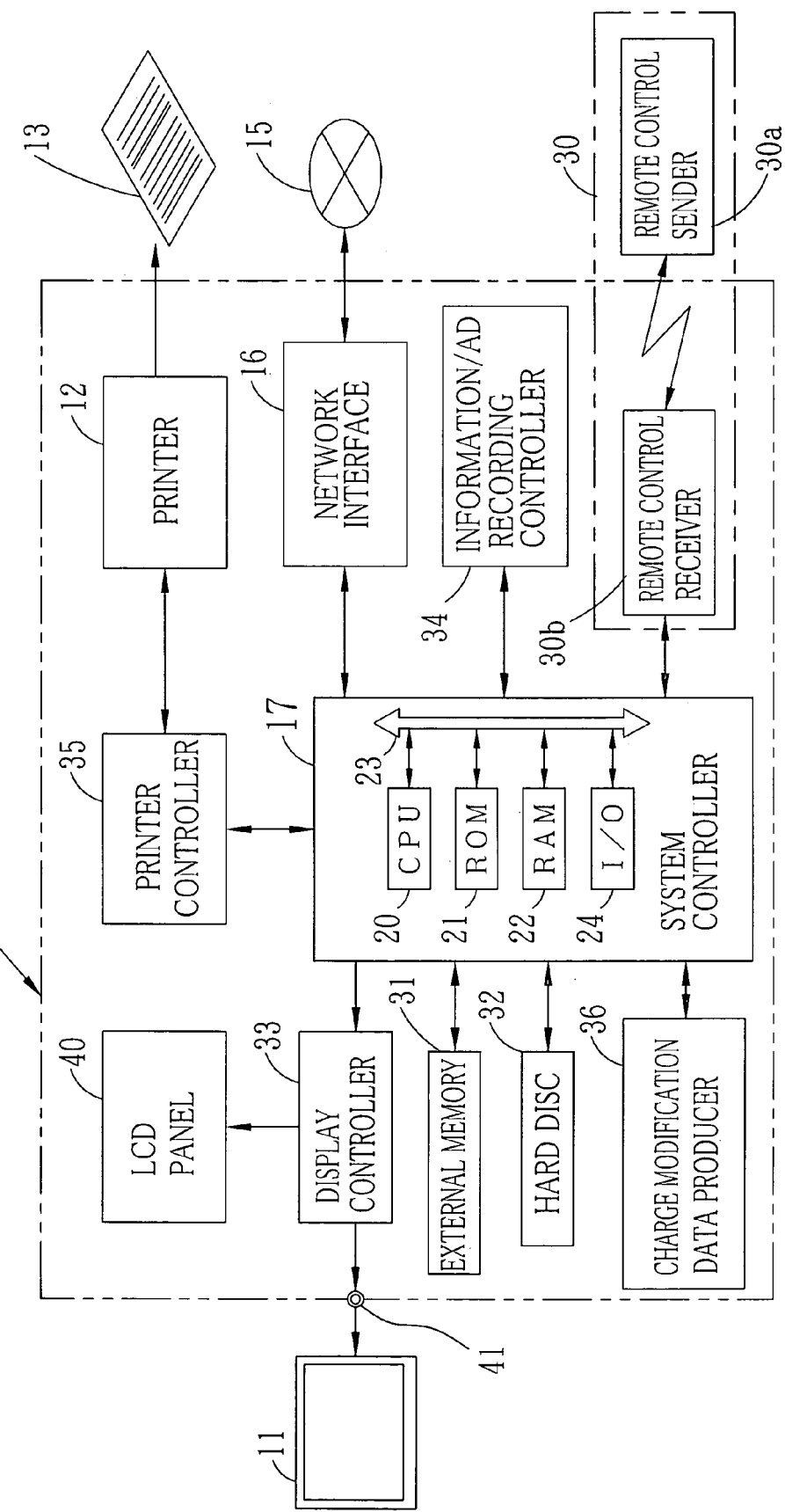
FIG. 1 is a block diagram illustrating a digital set top box according to an embodiment of the present invention.

A digital set top box (STB) 10 shown in FIG. 1 receives information as image data and voice data from a network 15, and outputs the received data to an external display 11, e.g., a home TV. The digital STB 10 also includes a printer 12, so it may provide hard copies 13 of electronic images represented by the image data.

Information provided from the network 15 includes texts, graphics, still images coded according to the JPEG or another standard, moving images coded according to the MPEG or another standard, and voice data. The data is sorted according to identifiers attached as a header to each data item. The data from the network 15 is entered to the system controller 17 through a network interface 16.

The system controller 17 is provided with CPU 20, ROM 21, RAM 22, a bus 23 and an I/O port 24, and is connected to a console 30, an external memory device 31, a hard disc 32, the network interface 16, a display controller 33, an information/ad recording controller 34, a printer controller 35 and a charge modification data producer 36.

The system controller 17 is installed with software for data communication through the network 15, and searching and reading of information from the network 15. Specific software to the digital STB 10 or the popular WWW (world-wide web) browser may be used for this purpose.

The console 30 consists of a remote control sender 30a and a remote control receiver 30b, so every operation from power ON-OFF to data communication and retrieval may be done by operating buttons of the remote control sender 30a. The remote control sender 30 is also used for setting up default values for printing ad data, as set forth in detail later. When any of the buttons of the remote control sender 30a is pressed, a corresponding menu screen appears on the external display 11, so the operator may carry out necessary operations by pressing the buttons in accordance with instructions on the external display 11.

The external memory device 31 may be attached with a recording media for supplying programs or data from outside to the system controller 17, or vise versa. As the external memory device 31, memory card reader/writers, floppy disc drivers, CD drivers, or DVD drivers are optionally used.

The hard disc 32 has programs for the data communication, searching and reading and any other data written by the system controller 17. Ad data is also written on the hard disc 32. The ad data is periodically downloaded from the network 15, and is sorted according to categories when written on the hard disc 32, so it is possible to print out the ad data in the same category by designating the category.

The image data from the system controller 17 is displayed on a LCD panel 40 through the display controller 33, and also on the external display device 11 through an external display output terminal 41. The LCD panel 40 may be omitted, or may be replaced by a small LCD panel that can display only several lines of characters to show the present mode of the digital STB 10.

The information/ad recording controller 34 produces print image data from information selected to print out as a hard copy 13 and ad data previously downloaded in the hard disc 32, in accordance with a predetermined format or a format designated by the operator prior to printing. The information/ad recording controller 34 produces the print image data by use of conventional image composing technique or image processing technique, in correspondence with resolution of the printer 12. The print image data is sent to the printer controller 35 through the system controller 17.

When a print command is sent from the remote control sender 30a of the console 30, the print image data is sent to the printer 12 through the system controller 17 and the printer controller 35. The printer 12 has an obverse printing section and a reverse printing section, so it can print on both sides of a recording sheet almost at once.

The charge modification data producer 36 produces charge modification data, for example, on the basis of the number of printed ad data items, as set forth in detail later.

Figure 2:
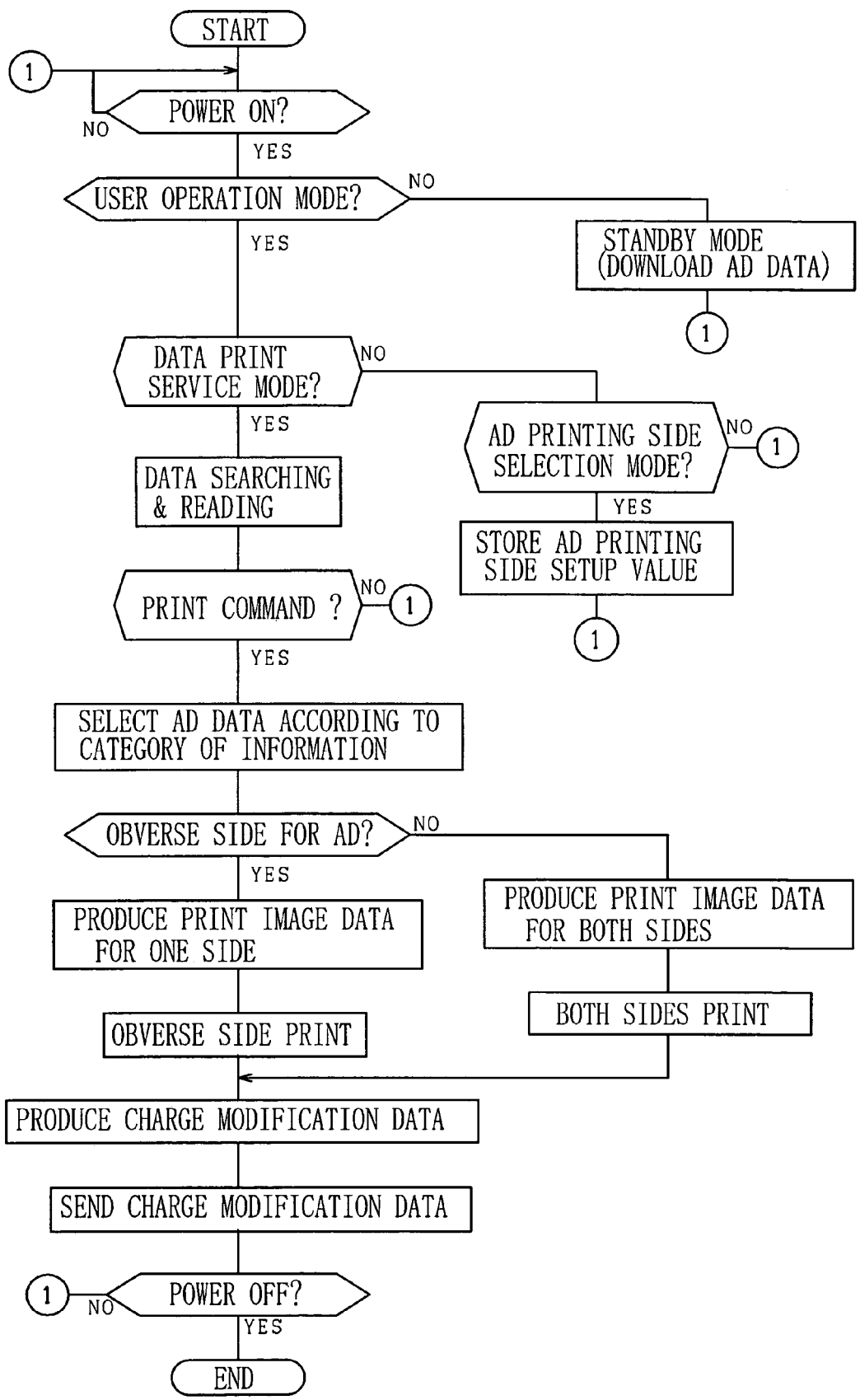
FIG. 2 is a flowchart illustrating an operation sequence in a system controller of the digital set top box.

The system controller 17 operates according to a sequence shown in FIG. 2. The system controller 17 is in a standby mode unless any operation signal is entered from the remote control sender 30a. In the standby mode, the system controller 17 is connected to predetermined ad servers on the network 15 at regular intervals, so the latest ad data is downloaded and is written on the hard disc 32 through the system controller 17.

When a user operation mode is selected by an operation signal from the remote control sender 30a, the system controller 17 first shifts to either a data print service mode or an ad printing side selection mode in accordance with that operation signal. The ad printing side selection mode is for presetting which side of a recording sheet ad data is to be printed. If the obverse side is chosen for printing ad data, ad data is printed on the same side as information that is retrieved from the network 15 and assigned to print out. On the other hand, if a reverse side is chosen for printing ad data, ad data is printed on the opposite side from the information. The preset value is memorized at a predetermined area on the hard disc 32, and is adopted in the following printing processes, insofar as it is revised. To revise the preset value, the ad printing side selection mode is selected again.

Thereafter, the user can search appropriate information from the network 15, and display retrieved information on the external display 11, so the user may read the retrieved information. To reserve the retrieved information as a hard copy 13, a print out key of the remote control sender 30a is pressed.

Then, the category of the retrieved information is determined based on the contents of the displayed information. Data indicating a category is previously written as header data in each data, so it is possible to determine the category with reference to the header data of the retrieved information.

Next, ad data relating to the category of the information to print is read out from the corresponding area of the hard disc 32. For instance, if the category of the information to print is "tourism", ad data relating to tourism is selected. The selection of the ad data is carried out with reference to a look-up table, but may be done by another device. Thereafter, print image data is produced from the information to print and the ad data relating to that information in accordance with the print format.

Figure 3A:
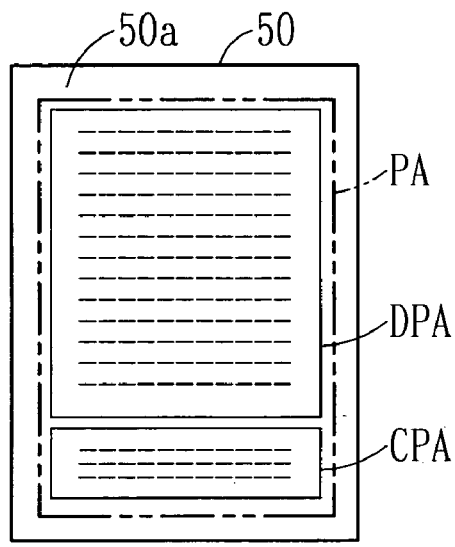
FIGS. 3A and 3B are explanatory diagrams illustrating examples of hard copies of different formats obtained while an obverse side of a recording sheet is chosen for printing ad data.
Figure 3B:
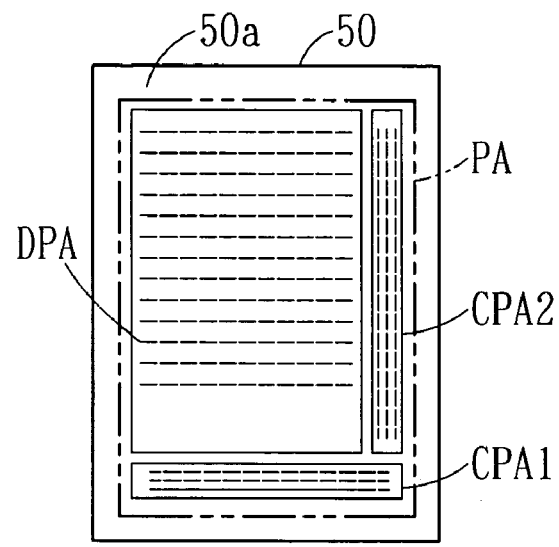

Then, a hard copy is printed out based on the produced print image data. While the obverse side is chosen for printing ad data, information and ad data are printed on the same side in a selected format, as shown for example in FIGS. 3A and 3B. In FIG. 3A, an ad data print area CPA is provided on the bottom side of an information print area DPA within a print area PA of an obverse side 50a of a recording sheet 50. In FIG. 3B, two ad print data areas CPA1 and CPA2 are located on the bottom and right sides of an information print area DPA within a print area PA of an obverse side 50a of a recording sheet 50.

Figure 3C:
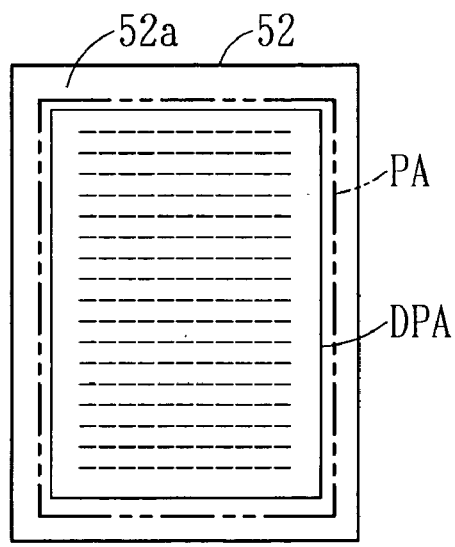
FIGS. 3C and 3D are explanatory diagrams illustrating examples of hard copies printed on opposite sides of a recording sheet, obtained while a reverse side is chosen for printing ad data.
Figure 3D:
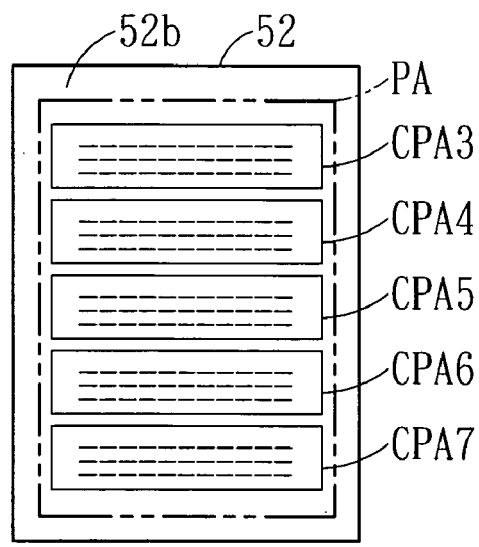
Figure 4:
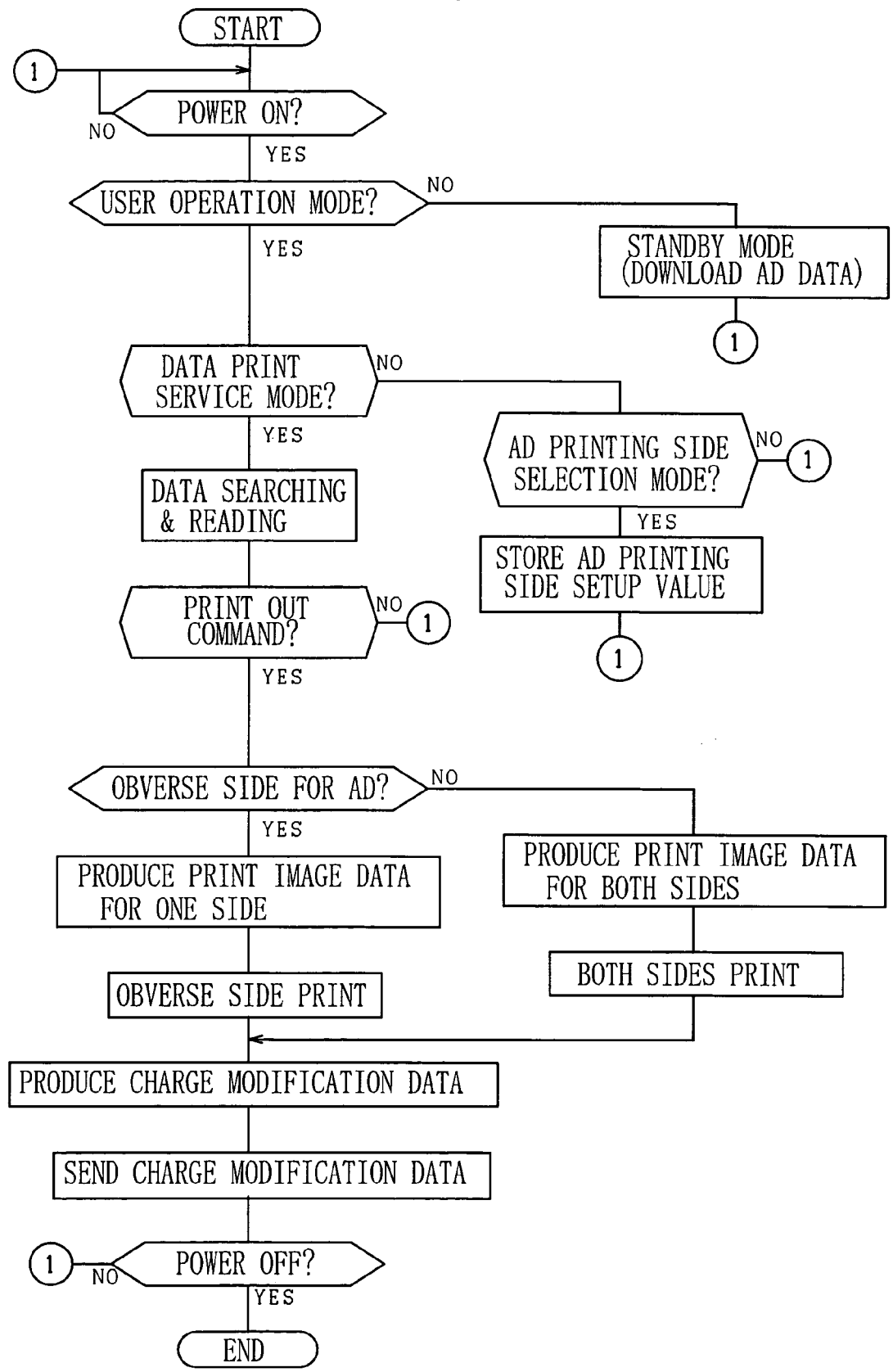
FIG. 4 is a flowchart illustrating an operation sequence of the system controller according to another embodiment of the present invention.

While the reverse side is chosen for printing ad data, information and ad data are printed on the opposite sides 52a and 52b of a recording sheet 52, as shown for example in FIGS. 3C and 3D. By printing ad data on the opposite side from information, an entire print area PA on the obverse side 52a of the recording sheet 52 may be used for an information print area DPA, whereas a plurality of ad data print areas CPA3, CPA4, CPA5, CPA6 and CPA7 may be provided in an print area PA on the reverse side 52b. Thus, the information may be printed at sufficient magnification, and the image quality of the information is not damaged by the ad data even if a large amount of ad data is printed with. Accordingly, the advertising effect is improved.

After printing, the charge modification data producer 36 produces charge modification data, and stores it. Then, the charge modification data is sent to a server that provides the ad data. The server calculates a discount on the connection charge on the basis of the charge modification data. According to the present embodiment, the discount is determined by the printed amount of ad data. For example, the discount is X1 when the number of printed ad data items is 1 to 10, X2 when the number of printed ad data items is 11 to 50, and X3 when more than 50 data items are printed out, wherein X1<X2<X3.

Instead of modifying the discount according to the grades of the printed number of ad data items, it is possible to define a unit discount value per one ad data item, and calculate a discount by multiplying the unit discount value by the ad data print number. It is also possible to define discount rates for several grades of the ad data print number, and calculate a discount according to this definition. It is to be noted that the connection charge may be adjusted appropriately according to another method, taking account of the benefit balance between the user, the advertiser and the server provider. The present invention is applicable not only to those charging systems where the charge varies depending upon the connection time, but also to those where the charge is fixed regardless of the connection time, and those where the charge is modified gradually according to several factors.

In the above embodiment, the charge modification data is stored and sent to the server after each printing. Alternatively, a group of charge modification data obtained in a predetermined period may be sent at once to the server, for example, at the time of downloading the latest ad data in the standby mode. Instead of sending the charge modification data, it is possible to calculate a discount based on the charge modification data in the digital STB 10, and send the calculated discount to the server.

Although ad data relating to the category of the selected information is sorted out and printed out with the information in the above embodiment, it is possible to print out all the downloaded ad data. Since each ad data has such a volume that five ad data items or so can be printed on one page, as shown for example in FIG. 3D, it sometimes happens that all the downloaded ad data cannot always be printed in one page. In that case, those ad data items which have not yet been printed out are printed at the printing of the next page.

It is also possible to print the sorted ad data at appropriate magnifications by changing the font or the like, so as to fulfill the entire ad data print area with the ad data.

Figure 5:
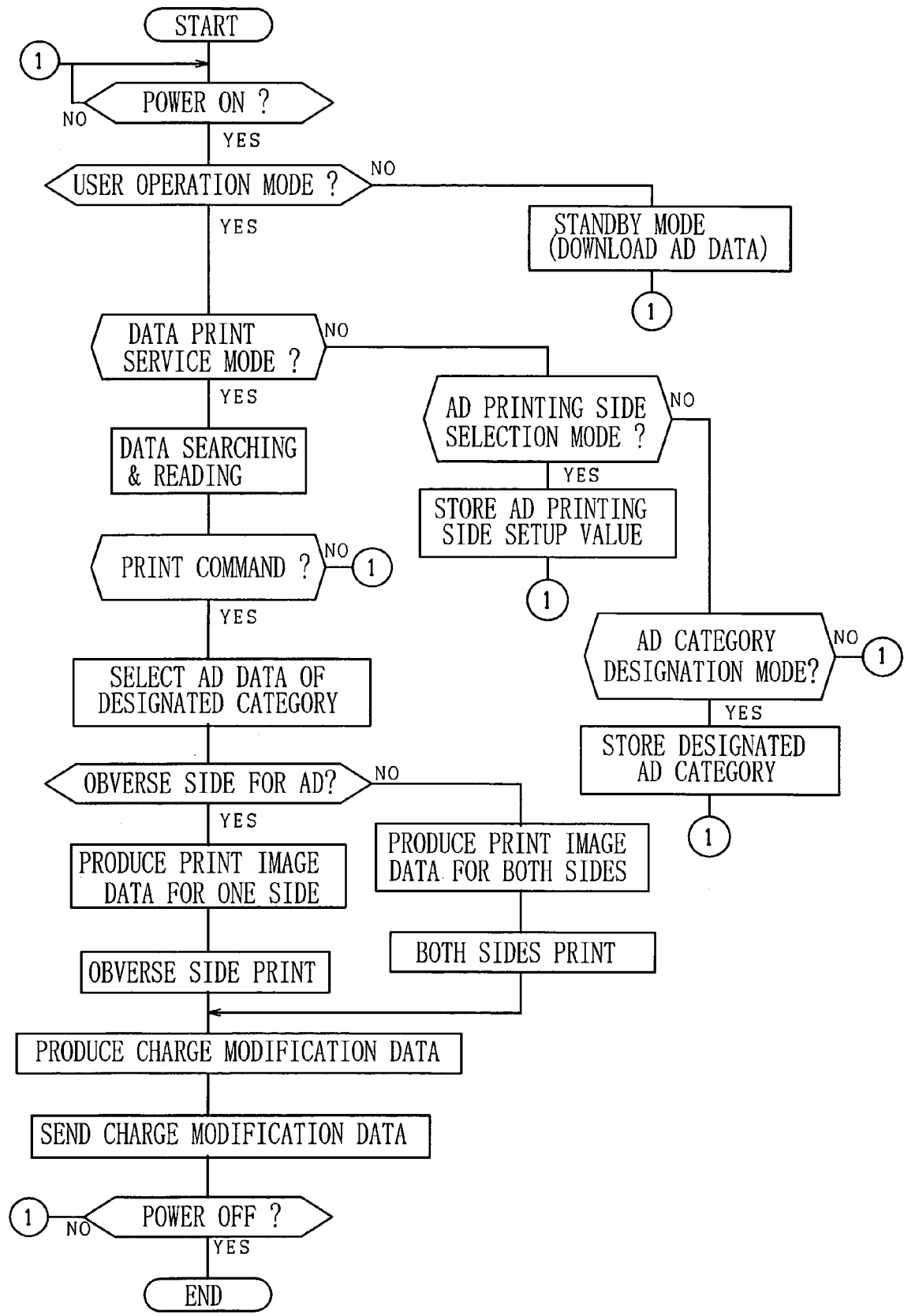
FIG. 5 is a flowchart illustrating an operation sequence of the system controller according to still another embodiment of the present invention.

According to another embodiment of the present invention, shown in FIG. 5, the user may designate the category of ad data to print out. There is provided an ad category designation mode in addition to the ad printing side selection mode. When the ad category designation mode is designated, a variety of ad data categories are displayed on the external display 11, so the user may designate appropriate ones of the ad data categories by operating selection buttons on the remote control sender 30a. At the printing, ad data items of the designated categories are sorted out and used for producing print image data.

Figure 6:
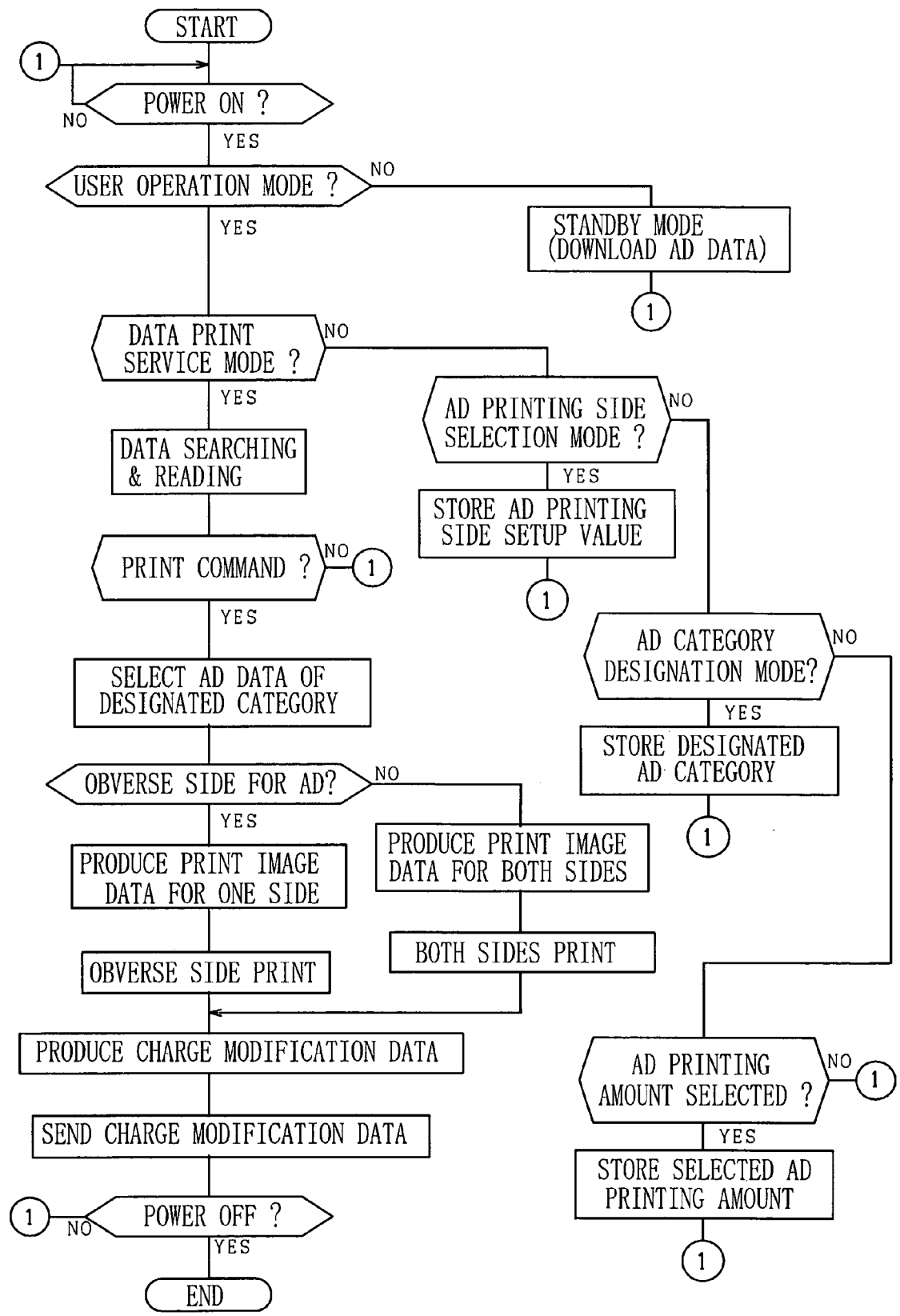
FIG. 6 is a flowchart illustrating an operation sequence of the system controller according to a further embodiment of the present invention.

FIG. 6 shows another embodiment of the present invention, wherein the printing amount of ad data may be selected in addition to the categories of the ad data to print out. According to this configuration, it is possible to reduce the printing amount of ad data when the obverse side is chosen for printing the ad data, thereby to obtain a sufficient space for printing the selected information. On the other hand, when the reverse side is chosen for printing ad data, it is possible to lower the charge by increasing the printing amount of ad data, or to get a hard copy of the selected information alone by selecting no ad data.

Although the latest ad data is downloaded in the standby mode in the above embodiment, it is possible to send ad data along with information when the information is retrieved.

Where the printing is charged separately from the connection, it is possible to introduce a discount on the printing charge according to the printed amount of ad data. It is also possible to vary the size of ad data printing area. The larger the ad data printing area, it gets the higher advertising effect, so it is possible to demand the higher charge for the advertisement from the advertiser, thereby to reduce the printing charge on the user.

Although the printer 12 has the printer sections specific for the obverse side and the reverse side, it is possible to use a printer of a type where the recording sheet is reversed after printing on the obverse side, to print on the reverse side. The printer 12 does not need to be incorporated into the digital STB 10, but may be connected to the digital STB. It is also possible to use an internal printer or an external printer alternatively.

The present invention has been described with respect to the digital STB, it may be embodied in data terminals consisting of ordinary personal computer systems. The network 15 is not limited to the Inter Net, but may be any kinds of networks, including digital broadcast systems using cables or satellite communication network.

Thus, the present invention is not limited to the above embodiments but, on the contrary, various modifications will be possible to those skilled in the art without departing from the scope of claims appended hereto.

What is claimed is:

1. A network data terminal for printing information obtained from a network comprising:
   a printer that is connectable to or incorporated into the data terminal, and is capable of printing on opposite sides of a recording sheet;
   a memory device for storing ad data received from the network;
   a device for allowing a user of the data terminal to choose whether to print the ad data on the same side of a recording sheet as the information or on the opposite side from the information;
   a print control device that produces print image data for one side or for both sides from the information and the ad data in accordance with which side of the recording sheet the ad data is to print, and controls the printer in accordance with the print image data; and
   a charge modification data sending device for sending data for modifying charge for provision of the information in accordance with amount of ad data printed with the information.

2. A network data terminal as claimed in claim 1, further comprising:
   a device for allowing the user to designate categories of the ad data to print with the information; and
   a sorting device for sorting out those ad data relating to the designated categories, for use in producing the print image data.

3. A network data terminal as claimed in claim 1 or 2, further comprising a device for allowing the user to select the amount of ad data to print with the information, wherein the charge is modified in accordance with the selected printing amount of ad data.

4. A network data terminal for printing information obtained from a network comprising:
   a printer that is connectable to or incorporated into the data terminal, and is capable of printing on opposite sides of a recording sheet;
   a memory device for storing ad data received from the network;
   a sorting device for detecting a category of the information to print, and automatically sorting out those ad data relating to the category of the information;
   a print control device that produces print image data from the information and the ad data sorted by the sorting device, and controls the printer in accordance with the print image data; and
   a charge modification data sending device for sending data for modifying charge for provision of the information in accordance with amount of ad data printed with the information.

5. A network data terminal as claimed in claim 1, further comprising:
   a device for allowing a user of the data terminal to choose whether to print the ad data on the same side of a recording sheet as the information or on the opposite side from the information, wherein the print control device produces print image data for one side or for both sides in accordance with which side of the recording sheet the ad data is to print.

6. A network data terminal as claimed in claim 4 or 5, further comprising a device for allowing a user of the data terminal to select the amount of ad data to print with the information, wherein the charge is modified in accordance with the selected printing amount of ad data.

7. A printing method for printing information obtained from a network by use of a printer that is connectable to or incorporated into a data terminal of the network, the method comprising the steps of:
   storing ad data received from the network;
   detecting a category of the information to print;
   sorting out those ad data relating to the category of the information;
   printing the sorted ad data along with the information; and
   modifying charge for provision of the information in accordance with the amount of ad data printed with the information.

8. A printing method as claimed in claim 7, wherein the information obtained from the network is printed on an obverse side of a recording sheet, whereas the ad data is printed on a reverse side of the recording sheet.

9. A printing method as claimed in claim 7 or 8, further comprising the step of designating the amount of ad data to print with the information.

10. A printing method for printing information obtained from a network by use of a printer that is connectable to or incorporated into a data terminal of the network, the method comprising the steps of:
    storing ad data received from the network;
    printing the information on an obverse side of a recording sheet, while printing the ad data on a reverse side of the recording sheet; and
    modifying charge for provision of the information in accordance with amount of ad data printed with the information.

11. A printing method as claimed in claim 10, further comprising the step of designating categories of the ad data to print with the information.

12. A printing method as claimed in claim 10 or 11, further comprising the step of designating the amount of ad data to print with the information.

13. A network data terminal as claimed in claim 1, wherein the charge comprises a cost to be paid by the user.

14. A network data terminal as claimed in claim 4, wherein the charge comprises a cost to be paid by the user.

15. A printing method as claimed in claim 7, wherein the charge comprises a cost to be paid by the user.

16. A printing method as claimed in claim 10, wherein the charge comprises a cost to be paid by the user.

17. The network data terminal of claim 1, wherein the terminal operably receives the combination of video and audio information as a television signal.

18. The network data terminal of claim 4, wherein the terminal operably receives the combination of video and audio information as a television signal.

* * * * *